(12) United States Patent
Wakamatsu et al.

(10) Patent No.: US 8,985,279 B2
(45) Date of Patent: Mar. 24, 2015

(54) METHOD FOR FEEDING GREASE COMPOSITION FOR GREASE-FEEDING

(75) Inventors: Hidenori Wakamatsu, Kitaibaraki (JP); Yuki Ariga, Kitaibaraki (JP)

(73) Assignee: NOK Klueber Co., Ltd., Tokyo (JP)

( * ) Notice: Subject to any disclaimer, the term of this patent is extended or adjusted under 35 U.S.C. 154(b) by 0 days.

(21) Appl. No.: 13/634,892

(22) PCT Filed: Mar. 7, 2011

(86) PCT No.: PCT/JP2011/055188
§ 371 (c)(1),
(2), (4) Date: Sep. 17, 2012

(87) PCT Pub. No.: WO2011/114921
PCT Pub. Date: Sep. 22, 2011

(65) Prior Publication Data
US 2013/0008747 A1 Jan. 10, 2013

(30) Foreign Application Priority Data

Mar. 16, 2010 (JP) ................. 2010-058613

(51) Int. Cl.
*F16N 15/00* (2006.01)
*F16C 33/66* (2006.01)
(Continued)

(52) U.S. Cl.
CPC ......... *F16C 33/6622* (2013.01); *F16C 33/6633* (2013.01); *F16C 13/006* (2013.01); *C10M 169/02* (2013.01); *F16C 2240/00* (2013.01); *F16C 2326/58* (2013.01); *C10M 2213/0606* (2013.01); *C10M 2213/0626* (2013.01);
(Continued)

(58) Field of Classification Search
USPC .............................. 184/26; 508/182; 384/462
See application file for complete search history.

(56) References Cited

U.S. PATENT DOCUMENTS 2,265,554 A * 12/1941 Thomas ......................... 74/569
3,752,543 A * 8/1973 Schmidt ........................ 384/484
(Continued)

FOREIGN PATENT DOCUMENTS

| JP | 2003-097573 | 4/2003 |
| JP | 2003-207095 | 7/2003 |

(Continued)

OTHER PUBLICATIONS

International Search Report based on corresponding PCT application No. PCT/JP2011/055188 dated Apr. 5, 2011 (4 pgs).
(Continued)

*Primary Examiner* — Michael Mansen
*Assistant Examiner* — Michael Riegelman
(74) *Attorney, Agent, or Firm* — Brinks Gilson & Lione

(57) ABSTRACT

Disclosed is a method for feeding a grease composition for grease-feeding to bearing units comprising 35 to 85 wt. % of fluorine-based grease and 65 to 15 wt. % of fluorine-based organic solvent; the method comprising jetting the grease composition into an inner portion of a bearing unit, such as a bearing for a conveyor chain having a grease-feeding hole, so as to feed the fluorine-based grease in an amount accounting for 10 to 45 volume % of the space volume in the bearing. According to the grease-feeding method, the grease composition for grease-feeding can be effectively applied to a bearing unit having a grease-feeding hole (nipple), thereby can be sufficiently supplied to a lubrication part, and allows grease-feeding without leakage from the bearing unit.

5 Claims, 1 Drawing Sheet

(51) Int. Cl.
*F16C 13/00* (2006.01)
*C10M 169/02* (2006.01)

(52) U.S. Cl.
CPC ......... *C10N2220/12* (2013.01); *C10N 2230/02* (2013.01); *C10N 2240/02* (2013.01); *C10N 2250/10* (2013.01)
USPC .......................................................... 184/26

(56) References Cited

U.S. PATENT DOCUMENTS

| | | | |
|---|---|---|---|
| 4,106,826 A * | 8/1978 | Marola et al. | 384/466 |
| 4,113,327 A * | 9/1978 | Koch | 384/482 |
| 6,015,237 A * | 1/2000 | Ogawa | 384/475 |
| 6,017,152 A * | 1/2000 | Ogawa et al. | 384/466 |
| 6,056,444 A * | 5/2000 | Ogawa et al. | 384/475 |
| 6,905,248 B2 * | 6/2005 | Katagiri et al. | 384/462 |
| 7,823,697 B2 * | 11/2010 | Nishiwaki et al. | 184/105.3 |
| 2004/0081380 A1 * | 4/2004 | Katagiri et al. | 384/462 |
| 2011/0048855 A1 * | 3/2011 | Penner et al. | 184/5.1 |

FOREIGN PATENT DOCUMENTS

| | | |
|---|---|---|
| JP | 2005-155791 | 6/2005 |
| JP | 2007-192354 | 8/2007 |
| JP | 2007-217511 | 8/2007 |
| JP | 2008-082395 | 4/2008 |

OTHER PUBLICATIONS

International Preliminary Report on Patentability and Written Opinion based on corresponding PCT application No. PCT/JP2011/055188 dated Nov. 1, 2012 (7 pgs).

* cited by examiner

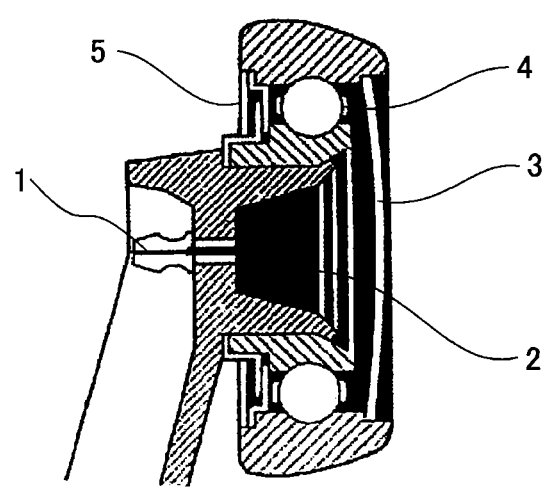

METHOD FOR FEEDING GREASE COMPOSITION FOR GREASE-FEEDING

RELATED APPLICATION

This application is a 35 U.S.C. §371 national phase filing of International Patent Application No. PCT/JP2011/055188, filed Mar. 7, 2011, to which priority is claimed under 35 U.S.C. §119 to Japanese Patent Application No. 2010-058613, filed Mar. 16, 2010.

TECHNICAL FIELD

The present invention relates to a method for feeding a grease composition for grease-feeding. More particularly, the present invention relates to a method for feeding a grease composition for grease-feeding that can be effectively applied to a bearing unit having a grease-feeding hole (nipple).

BACKGROUND ART

Conventional bearing units to be lubricated with grease have a grease-feeding hole (nipple). Grease-feeding is regularly carried out to recover the lubrication performance of grease and to extend the duration of use of the bearing unit. Unlike lubricating oils, grease to be fed has poor fluidity and is therefore grease-fed to a lubrication part of a bearing unit (e.g., sliding interfaces between of a rolling element and track rings, retainer, etc.) in such a manner that the grease is pressurized by a grease-feeding unit and continuously pressed into the bearing unit.

Patent Documents 1 and 2 disclose methods for feeding grease to a ball-and-roller bearing using air pressure, wherein the grease is used as it is, without diluting.

However, these grease-feeding methods do not allow regular feeding of a small amount of grease to lubrication parts. Accordingly, an excessive amount of grease is always supplied, causing an increase in rotation torque of the bearing unit and grease leakage from the bearing unit. Moreover, not all of the overly supplied grease reaches the lubrication part, and some may remain in the supply path. Thus, the whole grease does not contribute to lubrication, and generation of waste grease is inevitable. In addition, since the overly supplied grease is separated from the base oil with time, the separated oil may leak into the bearing unit. This problematically results in contamination of use environment, and curing of grease causes defects in grease-feeding.

Grease lubrication is employed, for example, in roller bearings of trolley conveyors used in automobile industries and other automation factories; however, conventional grease-feeding methods have problems, such as increase in roller rotation torque caused by overly supplied grease, contamination of use environment by grease leakage, and breakage of the roller caused by the shortage of lubrication of cured grease remaining in the supply path.

Grease having high consistency, namely soft grease, is sometimes used as feeding grease; however, such grease with high consistency has high fluidity and may therefore leak from out of the bearing unit depending on the amount of grease supplied, causing contamination of use environment.

Patent Document 3 discloses a solvent dilution-type fluorine-based lubricant composition obtained by dispersing a mixture of at least a fatty acid metal salt and a fluororesin as solid components and a base oil comprising at least a perfluoropolyether oil, in a solvent, thereby the composition preventing sedimentation of the solid components in the solvent after dilution with the solvent (e.g., a fluorine-based solvent) in a short time, and improving various properties, such as lubricity and durability.

In the solvent dilution-type fluorine-based lubricant composition, 0.1 to 20 mass % of solid components (i.e., fatty acid metal salt and fluororesin) and 0.1 to 40 mass % of perfluoropolyether oil are dispersed in the balance of 98.8 to 40 mass % of solvent. Due to this formulation, the composition can exhibit desired properties, that is, excellent dispersibility and lubrication performance. This composition comprises a fatty acid metal salt as an essential component. A composition of a comparative example, which does not use a fatty acid metal salt, comprises 1.2 to 5.0 wt. % of grease component based on 98.8 to 95.0 wt. % of solvent. The dispersibility of this composition is described to be insufficient.

Patent Document 3 indicates that the solvent dilution-type fluorine-based lubricant composition according to this invention can be effectively used to lubricate, for example, sliding parts of precision parts, the movements of which become slow because of the consistency of lubricating grease, and to lubricate between relative members to which lubricating grease is hardly supplied. Moreover, the composition is a dilution type having a lower grease content so as to be applied to thin films, and a large amount of leakage may occur during grease-feeding to a bearing unit. For this reason, the composition may not be suitable for grease-feeding.

PRIOR ART DOCUMENT

Patent Document

Patent Document 1: JP-A-2003-207095
Patent Document 2: JP-A-2008-82395
Patent Document 3: JP-A-2007-217511

Outline of the Invention

Problem to Be Solved by the Invention

An object of the present invention is to provide a method for feeding a grease composition for grease-feeding to bearing units, the composition being effectively applied to a bearing unit having a grease-feeding hole (nipple), being sufficiently supplied to a lubrication part, and not leaking from the bearing unit.

Means for Solving the Problem

The above object of the present invention can be achieved by feeding a grease composition for grease-feeding to bearing units comprising 35 to 85 wt. % of fluorine-based grease and 65 to 15 wt. % of fluorine-based organic solvent, the method comprising jetting the composition into an inner portion of a bearing unit having a grease-feeding hole.

Effect of the Invention

The grease-feeding method using the grease composition for grease-feeding according to the present invention comprising 35 to 85 wt. % of fluorine-based grease and 65 to 15 wt. % of fluorine-based organic solvent can prevent the grease from remaining in the supply path, which is problematic in conventional grease-feeding methods, and can exactly feed the grease to a portion of a bearing unit requiring lubrication by one discharge operation. Moreover, the grease returns to its original hardness after grease-feeding, because the solvent volatilizes. Accordingly, in the case of feeding grease having a high consistency, leakage of the grease from the bearing unit can be prevented. Furthermore, the grease-feeding type composition of the present invention is characteristically used in the form of grease, not in the form of liquid as with the solvent dilution-type composition disclosed in Patent Document 3.

The grease-feeding method using the grease composition for grease-feeding of the present invention having such effects is effectively applied to the field of feeding grease to bearing units having a grease-feeding hole (nipple), such as rolls of conveyor equipments, bearings for conveyor chains, and bearings for direct-acting guides.

BRIEF DESCRIPTION OF DRAWINGS

FIG. 1 shows a cross-sectional view of a trolley conveyor roller to which the grease composition for grease-feeding according to the present invention is applied.

EMBODIMENTS FOR CARRYING OUT THE INVENTION

For example, a method for feeding grease to a trolley conveyor roller is described. In FIG. 1 showing a cross-sectional view of a trolley conveyor roller, a diluted solution of grease supplied from a grease-feeding hole 1 passes through a space portion 2 (shown as a black portion) and is crashed to a shield plate 3 so that the grease is diffused in the roller and supplied to a lubrication part (sliding surface) 4 between a rolling body and track ring, retainer, etc. Sign 5 indicates a labyrinth seal. According to a conventional method, grease remaining in the space portion 2 causes poor grease-feeding and rotating defects due to curing of the grease. Furthermore, the grease remaining in the space portion 2 was not used for lubrication and was thus wasted.

The grease composition for grease-feeding bearing units comprises a fluorine-based grease and a fluorine-based organic solvent. The fluorine-based grease is composed of a perfluoropolyether oil and a thickener.

Perfluoropolyethers that can be used as the base oil are those represented by the general formula:

Perfluoropolyethers having a $(CF_2O)_n$ group as a polymer repeating unit can also be effectively used. Specific examples thereof include those represented by the following general formulae (1) to (3). In addition, those represented by the general formula (4) can also be used. Preferably, those represented by the general formula (3) are used. Rf is a perfluoro lower alkyl group having 1 to 5 carbon atoms, preferably 1 to 3 carbon atoms, such as perfluoromethyl group, perfluoroethyl group, or perfluoropropyl group.

(1) $RfO(CF_2CF_2O)_m(CF_2O)_nRf$ wherein m+n is 3 to 200, m:n is 10:90 to 90:10, and $CF_2CF_2O$ and $CF_2O$ groups are randomly bonded in the main chain. This compound can be obtained by complete fluorination of a precursor produced by photooxidation polymerization of tetrafluoroethylene.

(2) $RfO[CF(CF_3)CF_2O]_p(CF_2CF_2O)_q(CF_2O)_rRf$ wherein p+q+r is 3 to 200, q and r can be 0, (q+r)/p is 0 to 2, and $CF(CF_3)CF_2O$, $CF_2CF_2O$, and $CF_2O$ groups are randomly bonded in the main chain. This compound can be obtained by complete fluorination of a precursor produced by photooxidation polymerization of hexafluoropropene and tetrafluoroethylene.

(3) $RfO[CF(CF_3)CF_2O]_s(CF_2CF_2O)_tRf$ wherein s+t is 2 to 200, t can be 0, t/s is 0 to 2, and $CF(CF_3)CF_2O$ and $CF_2CF_2O$ groups are randomly bonded in the main chain. This compound can be obtained by complete fluorination of a precursor produced by photooxidation polymerization of hexafluoropropene and tetrafluoroethylene. Alternatively, it can be obtained by anionic polymerization of hexafluoropropylene oxide or tetrafluoroethylene oxide in the presence of a cesium fluoride catalyst, and treating the obtained acid fluoride compound having a terminal-$CF(CF_3)$ COF group with fluorine gas.

(4) $F(CF_2CF_2CF_2O)_{2-100}C_2F_5$

This compound can be obtained by anionic polymerization of 2,2,3,3-tetrafluorooxetane in the presence of a cesium fluoride catalyst, and treating the obtained fluorine-containing polyether $(CH_2CF_2CF_2O)_n$ with fluorine gas under UV irradiation at about 160 to 300° C.

Usable perfluoropolyether oil base oils are those having a kinetic viscosity at 40° C. of 2 to 2,000 mm$^2$/s, preferably 5 to 1,500 mm$^2$/s. The use of a perfluoropolyether oil base oil having a kinetic viscosity of less than this range may reduce service life (e.g., increased evaporation losses and reduced oil film strength) and may cause wear and burning adhesion. Conversely, the use of a perfluoropolyether oil base oil having a kinetic viscosity of more than this range may lead to defects of increasing consumption power and torque due to increased viscous resistance.

Usable thickeners are fluororesins that are conventionally used as lubricants. Specifically, polytetrafluoro ethylene, tetrafluoroethylene-hexafluoropropene copolymer, perfluoroalkylene resin, etc., can be used. Polytetrafluoroethylene is preferably used. As for usable polytetrafluoroethylene, tetrafluoroethylene is subjected to emulsion polymerization, suspension polymerization, solution polymerization, or like method to produce polytetrafluoroethylene, and the resulting polytetrafluoroethylene is processed by pyrolysis, degradation by electron-beam irradiation, physical pulverization, or like method, so that the number average molecular weight (Mn) is about 1,000 to 1,000,000. Moreover, the copolymerization reaction of tetrafluoroethylene and hexafluoropropene and the reduction of molecular weight are also carried out in the same manner as with polytetrafluoroethylene, so that the number average molecular weight (Mn) is about 1,000 to 600,000. The molecular weight can also be controlled by a chain transfer agent during the copolymerization reaction. The obtained fluororesin powder generally has an average primary particle size of about 500 μm or less, preferably about 0.1 to 30 μm.

Examples of grease using a perfluoropolyether oil represented by the general formula (3) and, as a thickener, a polytetrafluoroethylene resin powder include those comprising 55 to 85 wt. % of perfluoropolyether oil and 45 to 15 wt. % of polytetrafluoroethylene resin powder. For example, BARRIERTA L55/2J (produced by NOK Klueber Co., Ltd.), BARRIERTA JFE552 (produced by NOK Klueber Co., Ltd.), and other commercial products can be used.

Moreover, usable thickeners other than these fluororesins are metal soaps, such as lithium soaps, urea resins, minerals, such as bentonite, organic pigments, polyethylene, polypropylene, and polyamide. In terms of heat resistance and lubricity, aliphatic dicarboxylic acid metal salts, monoamide monocarboxylic acid metal salts, monoester carboxylic acid metal salts, diurea, triurea, tetraurea, etc., are preferably used.

Such fluororesin powders, metal soaps, urea, and other thickeners can be independently used singly or in combination. Such a thickener is used in an amount of 50 wt. % or less, generally 0.1 to 50 wt. %, preferably 1 to 40 wt. %, in the total amount of the thickener and the base oil. When the amount of thickener used is greater than this range, the composition becomes too hard. In contrast, when the amount is less than this range, the fluororesin, etc., cannot exhibit thickening ability, leading to deterioration of oil separation. Sufficient improvement in scatter resistance and leakage resistance cannot be expected.

The composition may further contain, if necessary, antioxidants, rust inhibitors, corrosion inhibitors, extreme pressure additives, oiliness agents, solid lubricants other than fluororesins, and other additives used in conventional lubricants.

Examples of antioxidants include phenol-based antioxidants, such as 2,6-di-tert-butyl-4-methylphenol and 4,4'-methylenebis(2,6-di-tert-butylphenol); amine-based antioxidants, such as alkyldiphenylamine, triphenylamine, phenyl-α-naphthylamine, phenothiazine, alkylated phenyl-α-naphthylamine, and alkylated phenothiazine; and the like.

Examples of rust inhibitors include fatty acids, fatty acid amines, alkylsulfonic acid metal salts, alkylsulfonic acid amine salts, oxidized paraffin, polyoxyethylene alkyl ethers, and the like. Examples of corrosion inhibitors include benzotriazole, benzoimidazole, thiadiazole, and the like.

Examples of extreme pressure additives include phosphorus-based compounds, such as phosphoric acid esters, phosphorous acid esters, and phosphoric acid ester amine salts; sulfur-based compounds, such as sulfides and disulfides; sulfur-based compound metal salts, such as dialkyldithiophosphoric acid metal salts and dialkyldithiocarbamic acid metal salts; and the like.

Examples of oiliness agents include fatty acids or esters thereof, higher alcohols, polyhydric alcohols or esters thereof, aliphatic amines, fatty acid monoglycerides, and the like. Examples of solid lubricants other than fluororesins include molybdenum disulfide, graphite, boron nitride, silane nitride, and the like.

Additionally, solid lubricants other than fluororesins, such as molybdenum disulfide, graphite, boron nitride, and silane nitride, can also be added.

Moreover, usable examples of fluorine-based organic solvents include hydrochlorofluorocarbon, hydrofluorocarbon, hydrofluoroether, perfluoroalkane, and the like. Actually, commercial products, such as HCFC-225 and HFE-449 (HEF-7100, produced by Sumitomo 3M), HFE-569 (HFE-7200, produced by Sumitomo 3M), $C_nF_{2n+2}$ (n: 5 to 8; Fluorinert PF-5050, Fluorinert PF-5060, Fluorinert PF-5070, and Fluorinert PF-5080, produced by Sumitomo 3M), Vertrel XF (Dupont-Mitsui Fluorochemicals, Co., Ltd.), and the like can be used.

As for the proportion of fluorine-based grease and fluorine-based organic solvent, the former is used at a ratio of 35 to 85 wt. %, preferably 40 to 80 wt. %, while the latter is used at a ratio of 65 to 15 wt. %, preferably 60 to 20 wt. %. The key point in this case is the concentration range of the diluted grease composition for grease-feeding. When the concentration of dilution is higher than the specified ratio (fluorine-based grease:35 to 85 wt. %), the viscosity of the diluted solution remains high, and the grease cannot efficiently be supplied to the target area. In contrast, when the grease is overly diluted, viscosity becomes too low. Consequently, the diluted solution injected from the grease-feeding hole joins the air flow at the time of injection, and leaks to the outside through gaps in the sealed structure.

The preparation of the grease composition for grease-feeding is performed by mixing a fluorine-based grease and a fluorine-based organic solvent using a homomixer, a homogenizer, an ultrasonic dispersion apparatus, or the like. The prepared grease composition for grease-feeding is supplied by discharging a diluted solution of grease using a grease-feeding pump while preferably applying a pressure of about 0.4 to 0.7 MPa to the grease-feeding hole. Any grease-feeding pump can be used without limitation as long as it has a grease-feeding gun that can be pressed or connected to a grease-feeding hole, and a grease-feeding unit that can pressurize and discharge a diluted solution of grease. The grease-feeding pump preferably further comprises a constant volume flow valve for volume measurement.

In the case of feeding the grease composition for grease-feeding of the present invention to conveyor roller bearings, since they have almost similar structures and their space volumes are determined depending on the size of bearing, the amount of grease-feeding is set according to the bearing size, and the fluorine-based grease is used after being diluted with a fluorine-based organic solvent. Here, the amount of grease supplied is set to an amount accounting for 10 to 45 volume % of the space volume in the bearing.

According to the grease composition for grease-feeding of the present invention, when grease is supplied to a sealed ball-and-roller bearing, the fluidity of the grease is enhanced by diluting the grease to a predetermined concentration with a fluorine-based organic solvent compatible with the fluorine-based grease to be charged into the ball-and-roller bearing. Thereby, a small amount of grease can be efficiently supplied to the target ball-and-roller bearing, and grease-feeding can be completed by one discharge operation using air pressure to control the amount of discharge.

EXAMPLES

The following describes the present invention with reference to Examples.

Examples 1 to 3 and Comparative Examples 1 and 2

A perfluoropolyether oil (70 wt. %) and a predetermined amount of polytetrafluoroethylene resin powder thickener were mixed in a stirring kettle. The mixture was then homogenized with a three-roll mill, and the consistency was adjusted to No. 2. The thus-prepared fluorine-based grease (BARRIERTA L55/2J, produced by NOK Klueber Co., Ltd.) and a fluorine-based organic solvent (Fluorinert PF-5060, produced by Sumitomo 3M) were mixed at a specific ratio, and dispersed by a homomixer. Grease compositions for grease-feeding were prepared in this manner.

Each of the prepared grease compositions for grease-feeding was supplied to a trolley conveyor roller, whose cross section is shown in FIG. 1, under the following grease-feeding conditions:

Grease-feeding pump: reciprocating pump (working pressure: 0.4 to 0.7 MPa)
Conveyor roller: 4-inch conveyor roller (space volume: 22 ml)
Amount of feeding-grease: 6 g (volume: 3.2 ml)
Discharge pressure: 0.5 MPa The amount of grease supplied to the lubrication part in an inner portion of the roller, and the occurrence of leakage from the roller were examined.

The evaluation was performed by visually observing the state of adhesion of the grease after grease-feeding. Sufficient adhesion to the lubrication part (sliding surface) was marked as ○, and insufficient adhesion was marked as X. In addition, the occurrence of leakage from the gap of the labyrinth seal during sealing was observed. The case where no leakage occurred was marked as ○, and the case where leakage occurred was marked as X.

The following table shows the evaluation results, together with the compounding proportion of fluorine-based grease and fluorine-based organic solvent. When the state of the prepared grease compositions for grease-feeding was observed, the composition of Comparative Example 1 was in the form of liquid, while the compositions of Examples 1 to 3 and Comparative Example 2 were in the form of grease.

TABLE

|  | Comp. Ex. 1 | Ex. 1 | Ex. 2 | Ex. 3 | Comp. Ex. 2 |
|---|---|---|---|---|---|
| [Compounding proportion] | | | | | |
| Fluorine-based grease (wt. %) | 30 | 40 | 60 | 80 | 90 |
| Fluorine-based organic solvent (wt. %) | 70 | 60 | 40 | 20 | 10 |
| [Evaluation results] | | | | | |
| Adhesion to sliding surface | ○ | ○ | ○ | ○ | X |
| Leakage from bearing unit | X | ○ | ○ | ○ | ○ |

REFERENCE SIGNS LIST

1. Grease-feeding hole
2. Space portion
3. Shield plate
4. Lubrication part
5. Labyrinth seal

The invention claimed is:

1. A method for feeding a grease composition comprising 35 to 85 wt. % of fluorine-based grease and 65 to 15 wt. % of fluorine-based organic solvent; the method comprising jetting the grease composition into an inner portion of a bearing unit having a grease nipple through a grease-feeding hole of the grease nipple so as to feed the grease in an amount accounting for 10 to 45 volume % of a space volume in the bearing and allowing the fluorine-based organic solvent to volatilize after said jetting so that the fluorine-based grease returns to an original hardness the fluorine-based grease had without the fluorine-based organic solvent.

2. The grease-feeding method according to claim 1, wherein the grease composition for grease-feeding is jetted by applying a pressure of 0.4 to 0.7 MPa.

3. The grease-feeding method according to claim 1, wherein the fluorine-based grease comprises 55 to 85 wt. % of perfluoropolyether oil and 45 to 15 wt. % of polytetrafluoroethylene resin powder.

4. The grease-feeding method according to claim 1, wherein the bearing unit is a bearing for a trolley conveyor roller.

5. The grease-feeding method according to claim 1, wherein the fluorine-based grease comprises 55 to 85 wt. % of perfluoropolyether oil and 45 to 15 wt. % of polytetrafluoroethylene resin powder.

* * * * *